(12) United States Patent
Bells

(10) Patent No.: US 9,031,783 B2
(45) Date of Patent: May 12, 2015

(54) REPOSITIONABLE GRAPHICAL CURRENT LOCATION INDICATOR

(71) Applicant: BlackBerry Limited, Waterloo (CA)

(72) Inventor: Matthew Bells, Ottawa (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 13/779,930

(22) Filed: Feb. 28, 2013

(65) Prior Publication Data

US 2014/0244165 A1  Aug. 28, 2014

(51) Int. Cl.
*G01C 21/36* (2006.01)

(52) U.S. Cl.
CPC .................................. *G01C 21/367* (2013.01)

(58) Field of Classification Search
USPC ................... 701/454, 455; 345/620; 455/457
See application file for complete search history.

(56) References Cited

U.S. PATENT DOCUMENTS

| | | | |
|---|---|---|---|
| 5,731,979 | A | 3/1998 | Yano |
| 5,848,373 | A * | 12/1998 | DeLorme et al. ............. 701/455 |
| 6,121,972 | A * | 9/2000 | Takahashi et al. ............ 345/419 |
| 6,202,026 | B1 * | 3/2001 | Nimura et al. ................ 701/455 |
| 2004/0257340 | A1 * | 12/2004 | Jawerth ......................... 345/157 |
| 2008/0091349 | A1 * | 4/2008 | Liu ............................... 701/211 |
| 2008/0228393 | A1 * | 9/2008 | Geelen et al. ................. 701/208 |
| 2009/0204892 | A1 * | 8/2009 | Cheung et al. ................ 715/249 |
| 2009/0326812 | A1 * | 12/2009 | Lee et al. ...................... 701/208 |
| 2010/0031186 | A1 * | 2/2010 | Tseng et al. .................. 715/786 |
| 2011/0320117 | A1 | 12/2011 | Sempuku |
| 2012/0157122 | A1 * | 6/2012 | Niranjan et al. ........... 455/456.2 |

FOREIGN PATENT DOCUMENTS

| | | | |
|---|---|---|---|
| EP | 1983302 | A1 * | 10/2008 |
| JP | 2004317417 | A * | 11/2004 |
| JP | 2009270886 | A * | 11/2009 |
| JP | 2010276454 | A * | 12/2010 |

OTHER PUBLICATIONS

Furuno Operator's Manual MFDBB by Larry Till (Published: Apr. 2008).*
European Search Report from corresponding EP application 13157148.1 dated Dec. 16, 2013.

* cited by examiner

*Primary Examiner* — John R Olszewski
*Assistant Examiner* — Jason Roberson
(74) *Attorney, Agent, or Firm* — Moffat & Co.

(57) ABSTRACT

A computer-implemented method includes determining a current location of a mobile device, displaying in a map viewport a first map area surrounding the current location of the mobile device and displaying on the first map area a graphical current location indicator representing the current location of the mobile device. The method further entails repositioning the graphical current location indicator relative to the map viewport by shifting the first map area to a partially overlapping second map area that includes both a new map area and a portion of the first map area that contains the graphical current location indicator.

19 Claims, 14 Drawing Sheets

REPOSITIONABLE GRAPHICAL CURRENT LOCATION INDICATOR

CROSS-REFERENCE TO RELATED APPLICATIONS

This is the first application filed for the present technology.

TECHNICAL FIELD

The present technology relates generally to mobile devices and, in particular, to mobile mapping and navigation applications.

BACKGROUND

Mobile devices may have position-determining subsystems that enable the device to determine its current position for navigation or other location-based services. This is commonly accomplished by incorporating into the mobile device a global navigation satellite system (GNSS) receiver such as a Global Positioning System (GPS) receiver. In most navigation applications, the current location of the mobile device is displayed on a map. In most conventional navigation applications, the map is displaced relative to a graphical current location indicator as the device moves. The current location indicator thus appears to be anchored to a fixed point onscreen, which is frequently the center of the map. When travelling in a generally constant direction, the onscreen map area behind the current location indicator is seldom of much utility to the user who is generally more interested in the map area that lies in the direction of travel.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
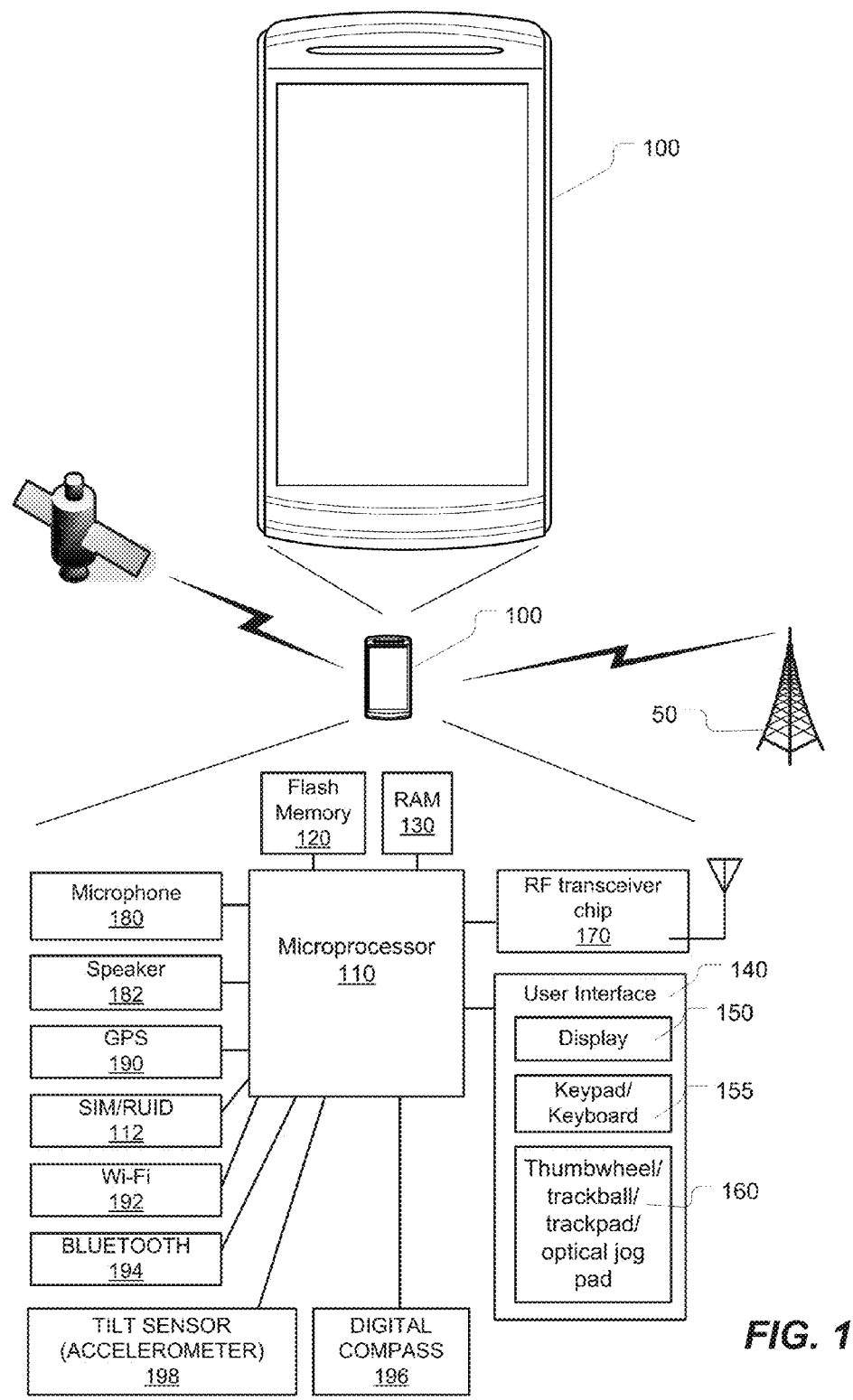
FIG. 1 is a depiction of a mobile device on which the present technology may be implemented, the depiction including a schematic depiction of some components of the mobile device.

The present technology provides a repositionable graphical current location indicator for a map or navigation application for a mobile device or for a map or tracking application for any other computing device. The graphical current location indicator along with its surrounding map area may be repositioned relative to a map viewport to increase or maximize the amount of map detail in a forward direction of travel. The repositioning of the indicator (with a concomitant displacement or shift of the surrounding map area) within the viewport may be in response to user input or it may be done automatically by the device (i.e. without user input).

Accordingly, one aspect of the present technology is a computer-implemented method that entails determining a current location of a mobile device, displaying in a map viewport a first map area surrounding the current location of the mobile device, displaying on the first map area a graphical current location indicator representing the current location of the mobile device, and repositioning the graphical current location indicator relative to the map viewport by shifting the first map area to a partially overlapping second map area that includes both a new map area and a portion of the first map area that contains the graphical current location indicator.

Another aspect of the present technology is a computer-readable medium comprising instructions in code which when loaded into a memory and executed by a processor of a computing device cause the computing device to determine a current location of a mobile device, display in a map viewport a first map area surrounding the current location of the mobile device, display on the first map area a graphical current location indicator representing the current location of the mobile device, and reposition the graphical current location indicator relative to the map viewport by shifting the first map area to a partially overlapping second map area that includes both a new map area and a portion of the first map area that contains the graphical current location indicator.

Another aspect of the present technology is a mobile device having a position-determining subsystem for determining a current location of the mobile device, and a processor coupled to the memory for causing a display to display in a map viewport a first map area surrounding the current location of the mobile device and to display on the first map area a graphical current location indicator representing the current location of the mobile device. The processor is configured to cooperate with the display to reposition the graphical current location indicator relative to the map viewport by shifting the first map area to a partially overlapping second map area that includes both a new map area and a portion of the first map area that contains the graphical current location indicator.

The details and particulars of these aspects of the technology will now be described below, by way of example, with reference to the drawings.

By way of overview, the present technology enables the relative position of a graphical current location indicator on a map to be changed. The graphical current location indicator may represent the current location of the user's own mobile device such as in a navigation application. Alternatively, the graphical current location indicator may represent the current location of another mobile device that is being tracked by a computing device. (The computing device may be another mobile device but it may also be a fixed device such as a desktop computer.) Repositioning may be in response to user input. The user input may be touch input or other manual input or a voice command. Alternatively, repositioning may be performed automatically (i.e. without user input or user intervention).

FIG. 1 is a depiction of a mobile device as one example of a computing device on which the present technology may be implemented. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the mobile device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the mobile device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The mobile device 100 may also include one or more ports for wired connections, e.g. USB, HDMI, FireWire (IEEE 1394), etc.

The mobile device 100 includes a speech-recognition subsystem that has a microphone 180 for transforming voice input in the form of sound waves into an electrical signal. The electrical signal is then processed by a speech-recognition module (digital signal processor) to determine keywords or phrases from the voice input.

Optionally, the mobile device 100 may include a speaker 182 and/or an earphone jack.

For implementing the present technology, the mobile device 100 includes a position-determining subsystem such as a global navigation satellite system (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites.

References herein to "GPS" are meant to include Assisted GPS and Aided GPS. Although the present disclosure refers expressly to the "Global Positioning System", it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

Another sort of positioning subsystem may be used as well, e.g. a radiolocation subsystem that determines its current location using radiolocation techniques, as will be elaborated below. In other words, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. A Wi-Fi™ Positioning System (WPS) may also be used as a positioning subsystem. Radiolocation techniques and/or WPS may also be used in conjunction with GPS in a hybrid positioning system.

Optionally, the mobile device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

As noted above, the present technology may used by a mobile device (wireless communications device, smart phone, cell phone, tablet, laptop, palmtop, portable navigation device, etc.) to track its own position, for example in a navigation application or a mapping application. The technology may also be used for any other mobile device or fixed computing device (e.g. desktop personal computer) to track another mobile device.

To implement this novel technology on a mobile device for use with a navigation application, the memory 120, 130 of the mobile device 100 depicted by way of example in FIG. 1 uses the position-determining subsystem, e.g. GPS receiver 190, to determine a current location of the mobile device. The processor 110 coupled to the memory 120, 130 causes the display 150 to display in a map viewport a first map area surrounding the current location of the mobile device and to display on the first map area a graphical current location indicator representing the current location of the mobile device. The map data for the first map area may be downloaded wirelessly from a map server having a map database.

The map data may be vector map data or bitmap data. The map data subdivided into a grid of map tiles for each one of a plurality of zoom levels. The mobile device may request map data by sending a map data request to the map server specifying an area of interest or bounding box. This request may include current location coordinates and the size of the bounding box. In response to the request, the map server determines which map tile or map tiles are required. The request may also specify which map layers are required or not required. The map server sends the map tiles (and appropriate layers thereof) to the device for rendering onscreen. The map rendered onscreen thus constitutes the first map area. The graphical current location indicator is also displayed on the first map area. This graphical current location indicator may be displayed in a default position, which may be, for example, in the center of the map area. The default position may be configured to be any other position with the map area adjusted accordingly. In one embodiment, the relative position of the graphical current location indicator is determined first before defining the bounding box and sending the request to the map server. Thus, the device can determine what map data is required based on the placement of the graphical current location indicator relative to the viewport.

The processor 110 is further configured to cooperate with the display 150 to reposition the graphical current location indicator relative to the map viewport by shifting, displacing or moving the first map area to a partially overlapping second map area that includes both a new map area and a portion of the first map area that contains the graphical current location indicator. In this manner, the graphical current location indicator remains visible in the portion of the map displayed within the viewport. The map viewport (or simply "viewport") for the purposes of this specification means the portion of the display screen that is displaying the actual map.

Figure 2:
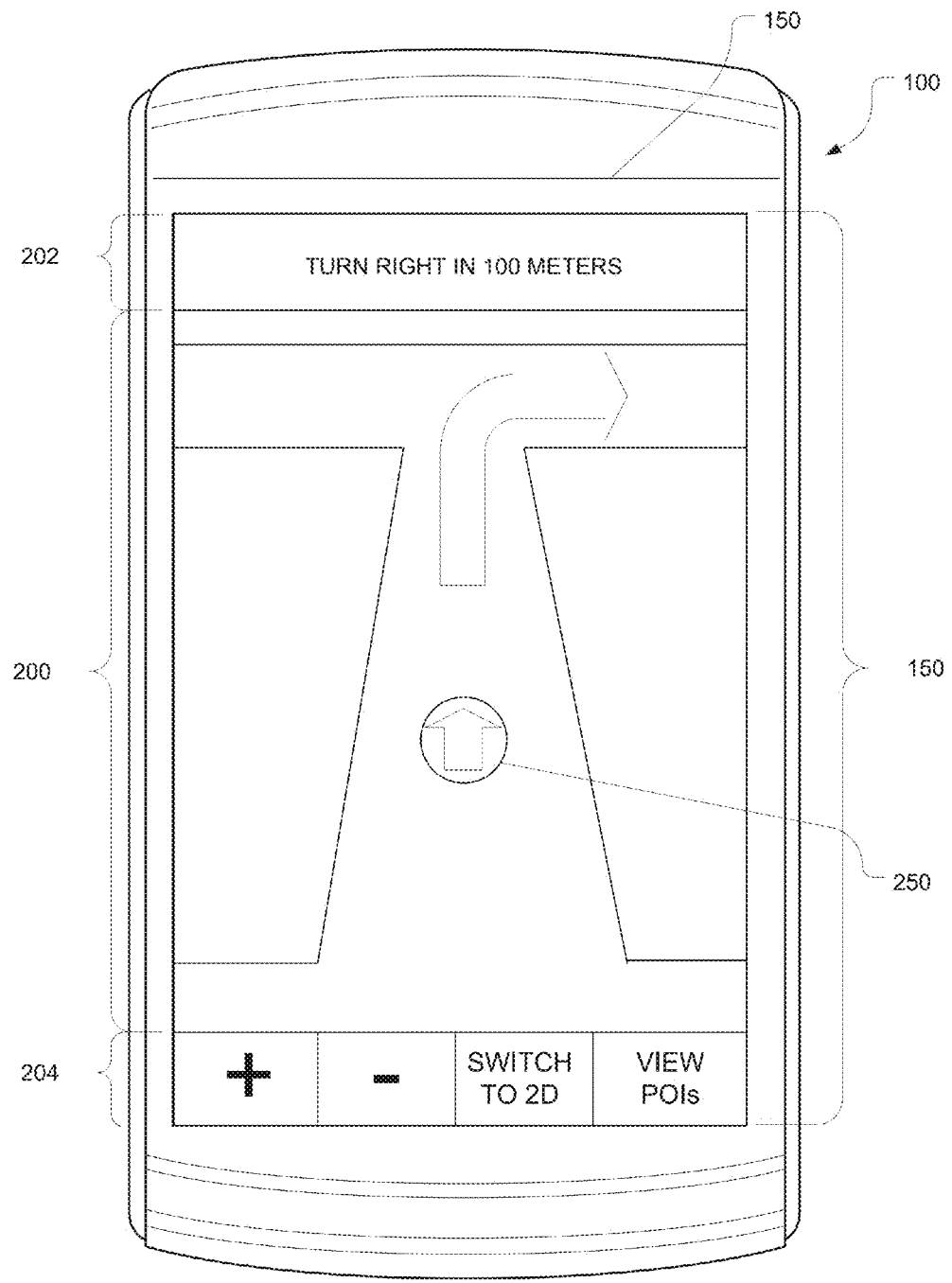
FIG. 2 is a depiction of a mobile device displaying a navigation screen provided by a navigation application executing on the mobile device.

FIG. 2 depicts a map viewport 200 on a display 150 of a mobile device 100. The map viewport may occupy less than the total available onscreen display space as shown by way of example in FIG. 2. An upper banner 202 and/or various lower user interface elements 204 may be displayed onscreen in conjunction with the map viewport 200. The user interface elements that are shown, for example, below the map viewport 200 may enable zooming in and zooming out, toggling between different types of views (2D versus 3D), viewing/filtering POIs, etc. Above the map viewport 200 may be a navigation banner 202 for displaying navigational instructions, e.g. "Turn right in 100 meters" (or "Turn right in 300 feet" for US units). The navigational instructions may also be audibly spoken though a speaker by a text-to-speech module. In FIG. 2, the map is shown by way of example as a 3D map view (or perspective map view) although the map view could be replaced by a 2D map view.

The map viewport 200 thus defines a first map area 205 on which the graphical current location indicator 250 is presented. The graphical current location indicator 250 may be placed at a default position relative to the viewport, e.g. in the center of the viewport, although any other default position may be utilized or user-configured. The graphical current location indicator 250 may be any icon, graphical representation, avatar, arrow, symbol, word, or combination thereof. The graphical current location indicator may be user-configurable, customizable or modifiable.

Figure 3:
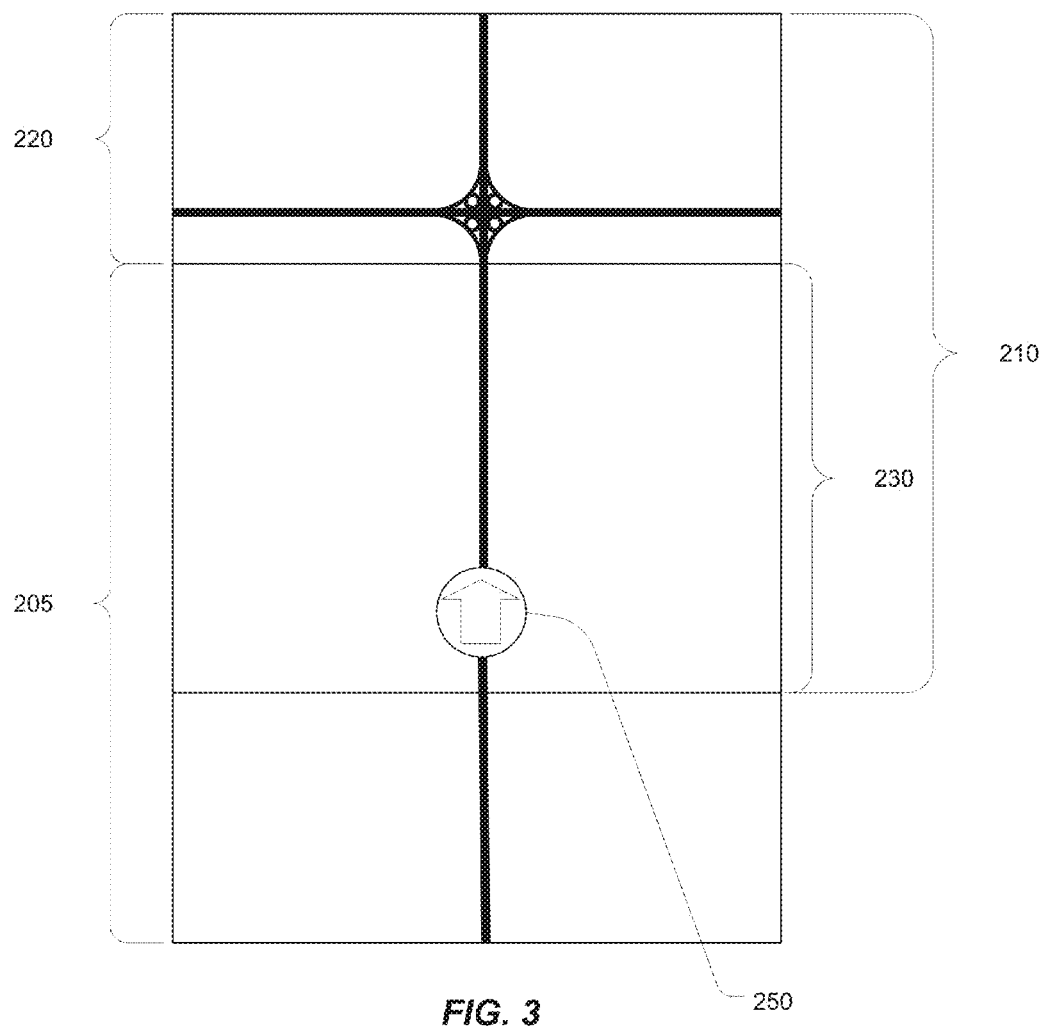
FIG. 3 depicts the shifting or displacement from a first map area to a partially overlapping second map area when the graphical current location indicator is repositioned.

With reference now to FIG. 3, the first map area 205 may be shifted either automatically or manually to a partially overlapping second map area 210. In shifting from the first map area 205 to the second map area 210, the graphical current location indicator 250 is repositioned relative to the viewport. For example, the graphical current location indicator may be displayed in a center of the viewport in the first map area (as a default setting). Shifting the viewable map area in the viewport (from the first to the second map area) thus has the effect of repositioning the graphical current location indicator relative to the viewport. This may be done to provide more map area in the forward direction of travel. FIG. 3 shows the shift from the first map area 205 to the second map area 210. Overlapping area 230 is retained and new map area 220 is added to constitute the second map area. The shift also has the effect of eliminating a portion of the first map area. In other words, the partially overlapping second map area 210 includes both the new map area 220 and a portion 230 of the first map area (i.e. the overlapping portion) that contains the graphical current location indicator 250. As can be seen from the simple example of FIG. 3, the shift brings into view the upcoming cloverleaf highway interchange. This additional map detail provides useful navigational information to the user.

Repositioning the graphical current location indicator (and the concomitant shifting of the map area) may be done in response to user input or it may be done automatically (without user input or user intervention). Manual repositioning/shifting may be accomplished by providing any sort of recognizable user input to the device, such as touch input, keyboard input, optical jog pad input, a voice command, etc.

Figure 4:
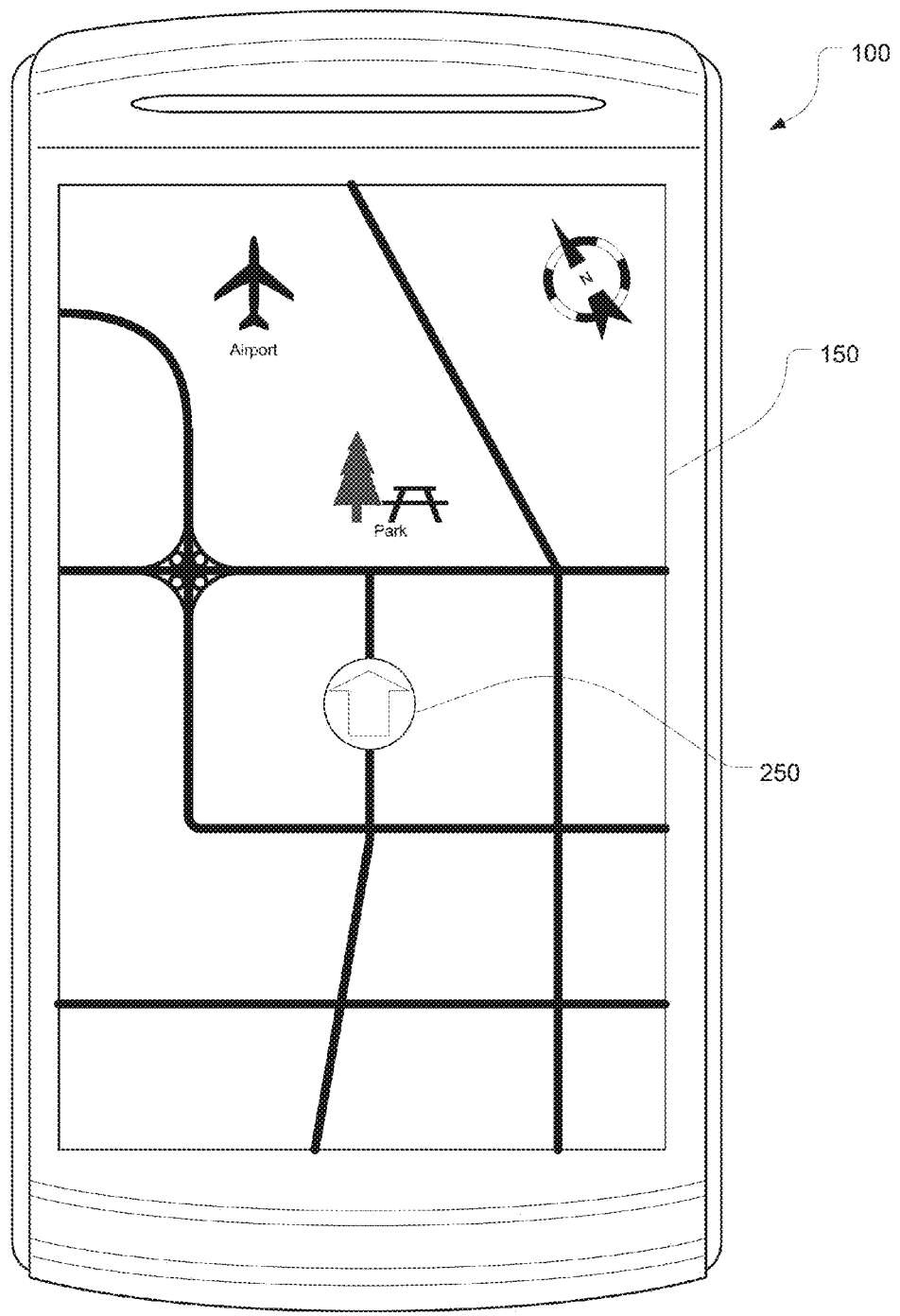
FIG. 4 depicts an example of a mobile device displaying a map with a graphical current location indicator.
Figure 5:
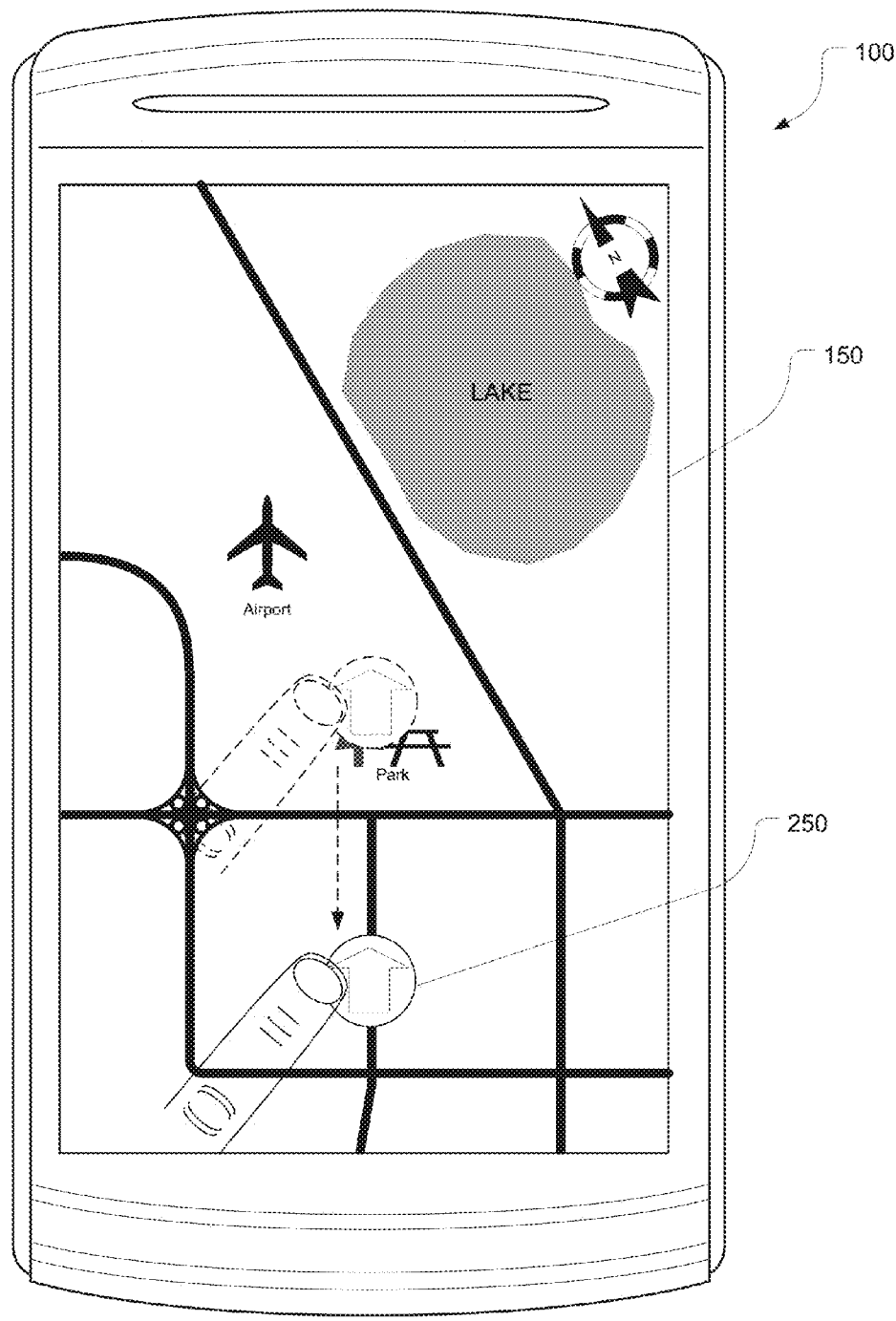
FIG. 5 depicts the repositioning of the graphical current location indicator and the concomitant shifting of the viewable map area from the map first area to the second map area.

FIG. 4 and FIG. 5 depict one way of manually repositioning the graphical current location indicator relative to the map viewport (which in this particular example occupies the entire display area of the mobile device). In this particular example, the mobile device 100 includes a touch-sensitive display 150. As shown by way of example in FIG. 4 and FIG. 5, the user repositions the graphical current location indicator 250 by touching and dragging the graphical current location indicator (to move the indicator as shown from FIG. 4 to FIG. 5). It will be appreciated that any other suitable input command or gesture may be used to displace the graphical current location indicator. Manual repositioning enables the user to change the relative position of the graphical current location indicator (and its surrounding map area) and the viewport. In one embodiment, the indicator is locked and must be unlocked before it can be moved. To unlock the indicator, the user may touch or tap the indicator, perform a predetermined gesture, or provide any other recognizable user input. The indicator may change color, shade, size or appearance in order to signify that the indicator has been unlocked and is thus movable onscreen. The indicator may automatically re-lock after a period of time, after movement or in response to further user input signifying a locking command. In one embodiment, the user may shift the map and indicator in any direction. In another embodiment, the user may not only shift the map and indicator but may also rotate the map and indicator to any desired orientation. A default orientation may be track-up (with the direction of travel pointing vertically upward on the display) or north-up (with north pointing vertically upward on the display). However, a user may wish the reorient the map to any other orientation.

Aside from manual repositioning, the mobile device may be configured to automatically reposition the graphical current location indicator and associated map area (i.e. without user input or user intervention). The mobile device may infer a direction of travel from a current heading, travel patterns, calendar entry or other such source in order to shift the map to optimize forward map area. The mobile device may also shift the indicator and map to increase or maximize the display of nearby navigational decisions points, points of interest, landmarks, search result locations, etc.

Accordingly, in one embodiment, the processor is configured to reposition the graphical current location indicator by automatically shifting from the first map area to the second map area based on a predicted direction of travel and/or a velocity of the mobile device. In one specific embodiment, the processor shifts the graphical current location indicator by an amount proportional to the velocity of the mobile device. The velocity and heading (direction of travel) may be determined using the GPS receiver. In this specific embodiment, the faster the device is travelling the more the indicator and map are shifted. It will be appreciated that the map scale (zoom level) may also be changed as the velocity increases. The scale change may thus be used in conjunction with the shifting of the indicator and map. In one particular embodiment, the indicator and map may be shifted until the indicator reaches the edge of the viewport beyond which the zoom level changes if the velocity continues to increase. At the lower zoom level, the indicator is more centrally displayed and can thus progressively shift rearwardly (with respect to the direction of travel) as the device continues to accelerate. Again, the device will permit the indicator to shift until it reaches the edge of the viewport at which point the scale again changes to an even lower zoom level.

As mentioned above, in another embodiment, the processor is configured to automatically shift from the first map area to the second map area to display a Point of Interest in the second map area that was not visible in the first map area. The shift may be lateral (left or right) or along an axis of travel (forward or rearward). The shifting to accommodate a Point of Interest or the location of a search result may be done at a fixed zoom level. In other embodiments, the zoom level may be adjusted to accommodate the POI.

Whether repositioning is manual or automatic, the underlying purpose is the same: to increase the amount of map area ahead of the device and/or in an area where there is useful information for the user (like POIs). The area rearward of the device is generally not of much use to the user who is typically much more interested in what lies ahead than what has just been passed. The rearward map area is thus mainly of interest for the general context it provides to the user. In other words, this information reminds the user where the user has just been, which may be useful in some cases. For example, the user may consult the map and see that he or she has just passed a given town or city and is heading into a rural area devoid of landmarks or POIs. The rearward map area is thus of some utility since it situates the user. The rearward map area may be presented at the same zoom level or it may be presented at a lower zoom level.

Figure 6:
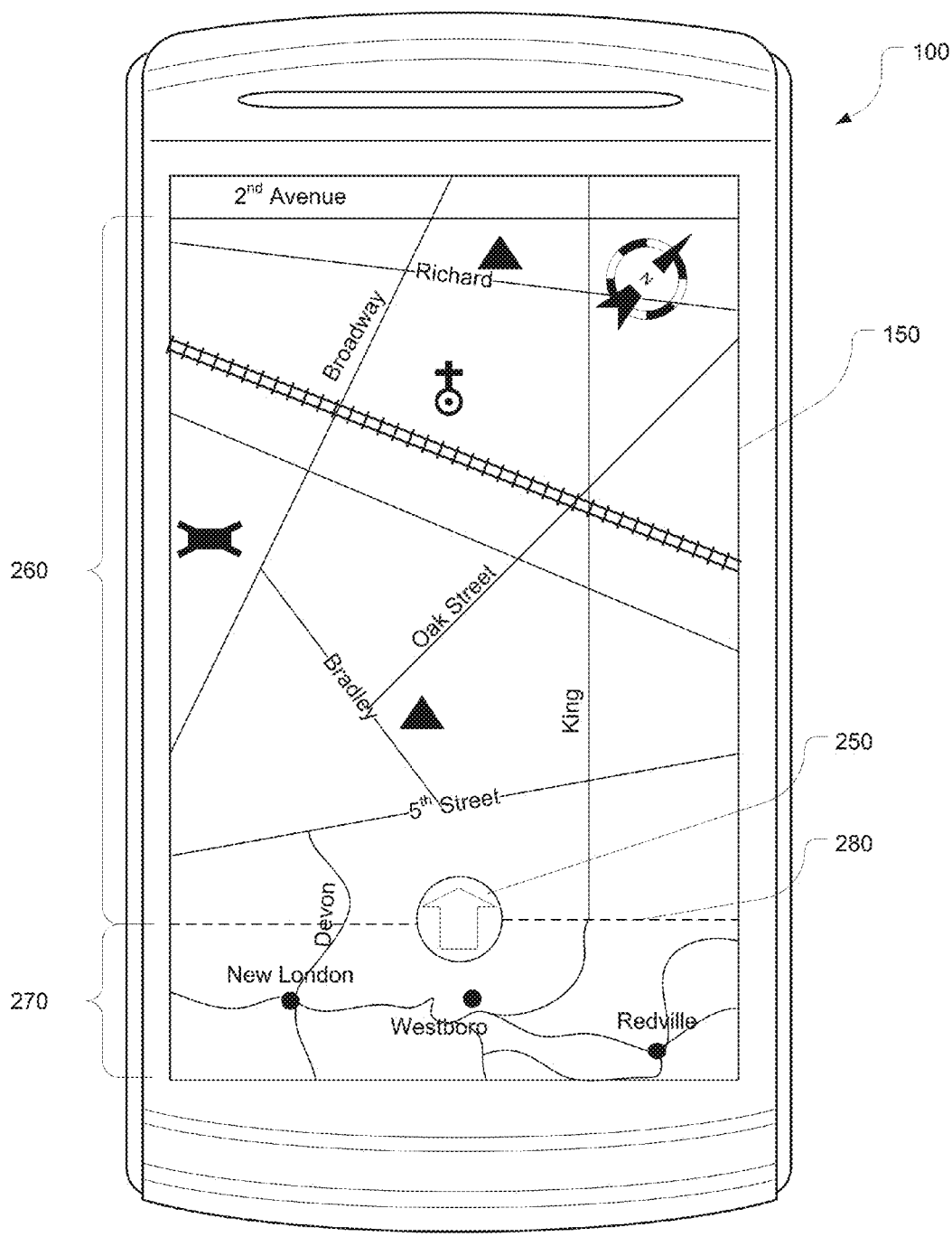
FIG. 6 depicts a two-scale map in which the forward map area is at a first zoom level and the rearward map area is a second zoom level.

Accordingly, in one embodiment, which is illustrated by way of example in FIG. 6, a forward map area 260 that is forward of the graphical current location indicator 250 is displayed at a first zoom level and a rearward map area 270 that is rearward of the graphical current location indicator is displayed at a second zoom level. The boundary 280 between the forward map area and the rearward map area may be redefined by user input or automatically.

Figure 7:
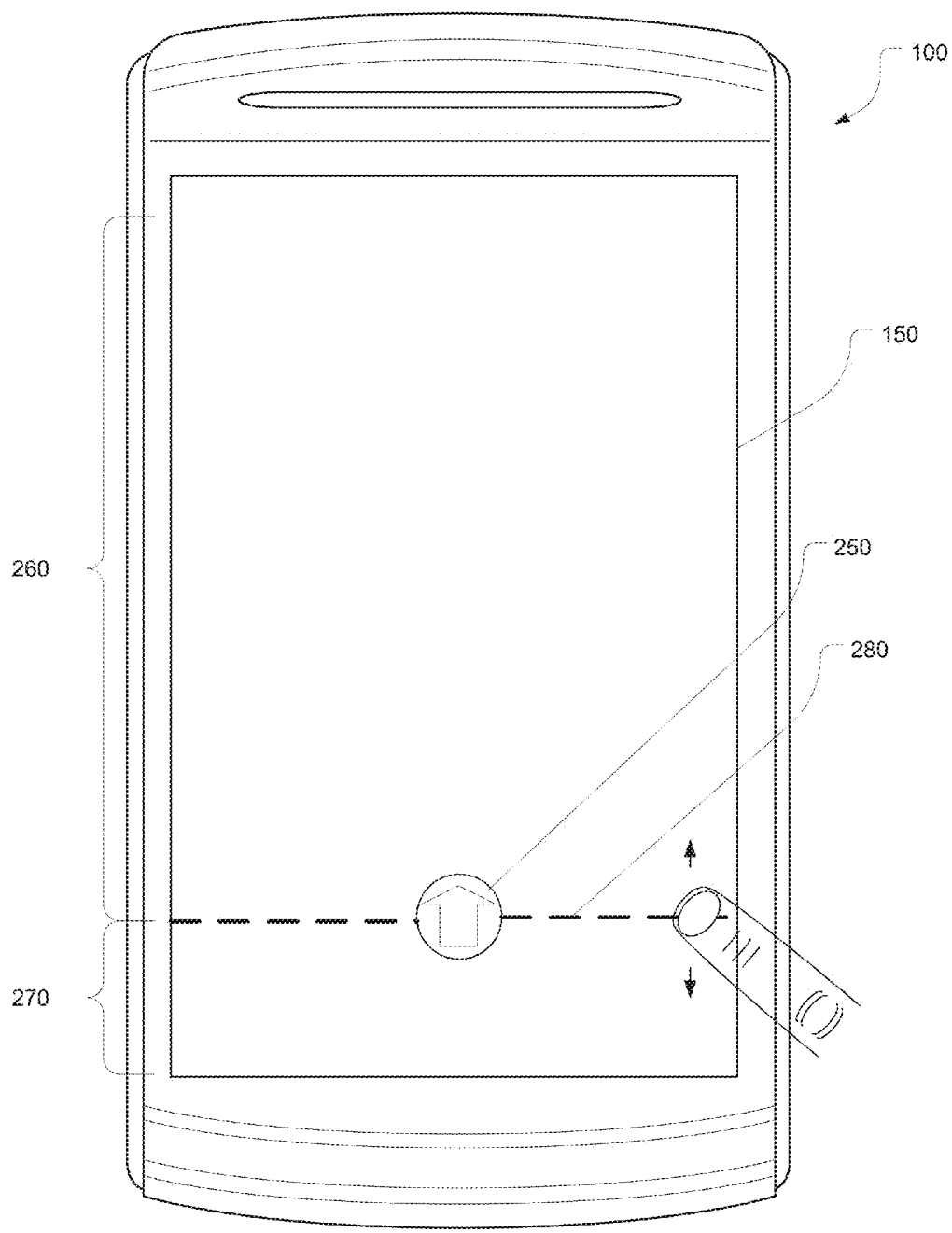
FIG. 7 depicts a mobile device receiving user input to relocate the boundary dividing the forward and rearward map areas.
Figure 8:
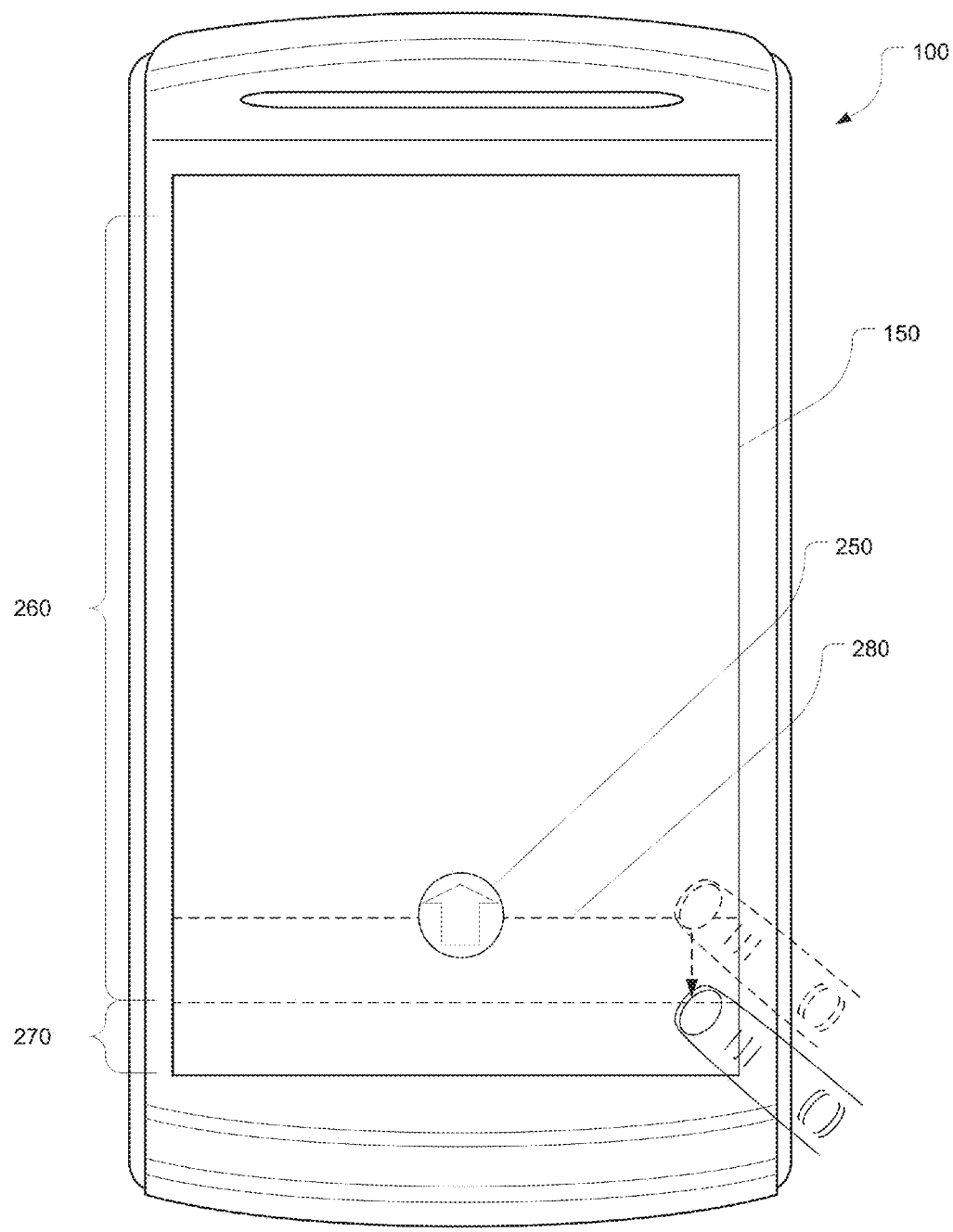
FIG. 8 depicts a mobile device after the boundary has been relocated rearwardly.
Figure 9:
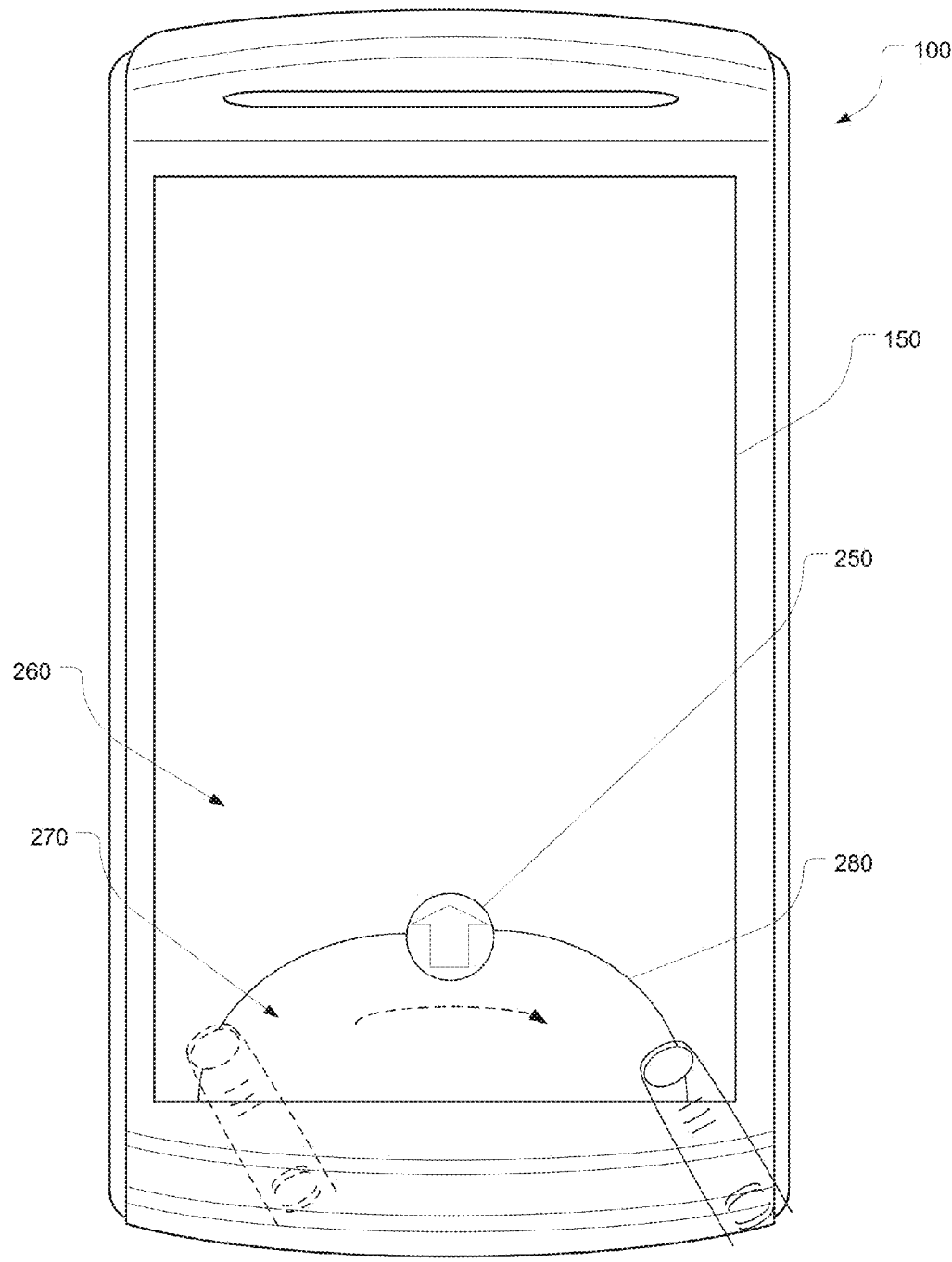
FIG. 9 depicts a mobile device receiving user input drawing a boundary between the forward and rearward map areas.

FIG. 7 depicts how this boundary 280 may be manually adjusted to vary the relative sizes of the forward map area 260 and the rearward map area 270. FIG. 7 shows how the boundary 280 may be relocated in response to simple touch-and-drag input. FIG. 8 depicts the relocated boundary 280. Note that the boundary 280 no longer passes through (or aligns with) the graphical current location indicator 250. FIG. 9 depicts a further example of how the user can draw any arbitrary boundary between the forward and rearward map areas. The user may also set the relative zoom levels (scales) or specify that there is to be no scale differential (i.e. no boundary).

Figure 10:
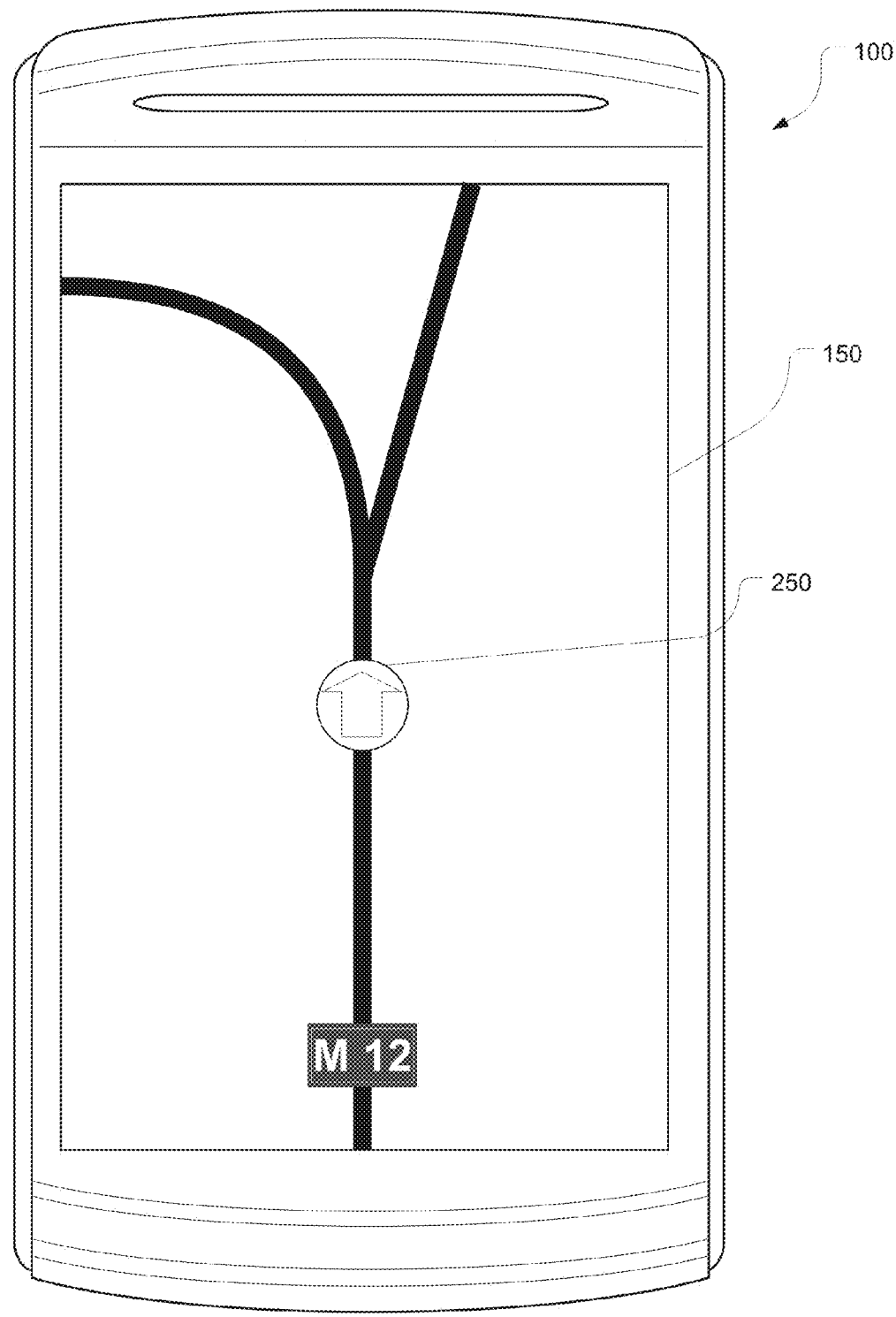
FIG. 10 depicts a mobile device displaying a navigation screen without any points of interest visible because all points of interest are beyond the first map area.
Figure 11:
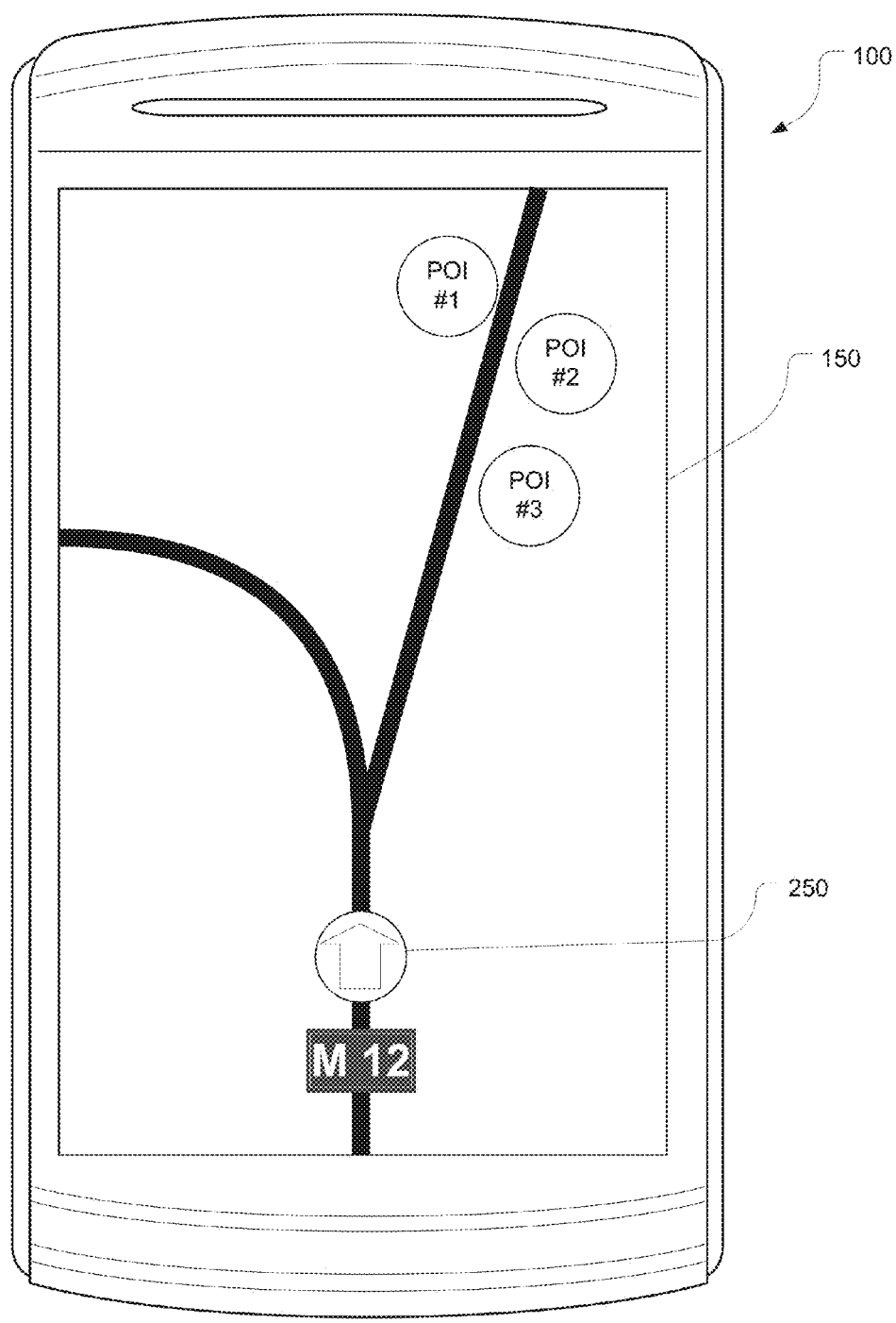
FIG. 11 depicts the automatic rearward repositioning of the graphical current location indicator and the concomitant shifting of the viewable map area from the first map area to the second map area in order to display points of interest that were not visible in the first map area but which are visible in the second map area.
Figure 12:
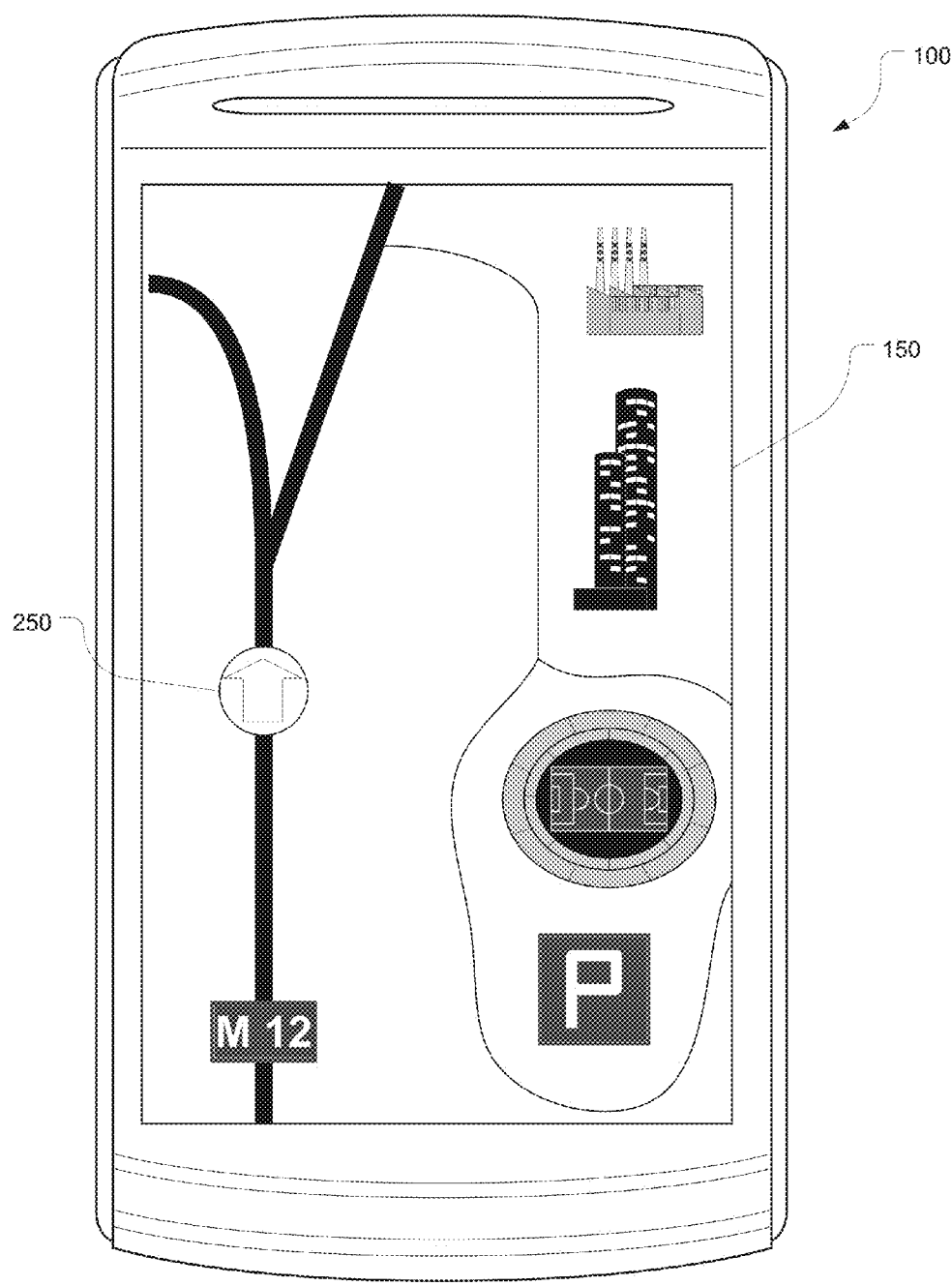
FIG. 12 depicts the automatic lateral repositioning of the graphical current location indicator to accommodate points of interests, landmarks, navigational decision points, or other map detail.

FIG. 10, FIG. 11 and FIG. 12 depict further examples of how the mobile device can be configured to automatically shift the viewable map area from a first map area to a second map area in order to accommodate points of interest (FIG. 11) or other map detail or navigational decision points (FIG. 12) while still retaining the graphical current location indicator 250 in the viewport. FIG. 10 shows a mobile device displaying a map rendered by a processor executing a navigation application. The graphical current location indicator 250 shows that the mobile device is traveling on highway M12. Although there are nearby points of interest, these POIs are not visible on the first map area at the given scale. FIG. 11 shows how the indicator 250 and its associated map area are shifted downwardly to accommodate the three points of interest (POI#1, POI#2, POI#3) which would otherwise not be visible. The same scale is retained so the user does not lose map detail. The same concept may be applied to the locations of search results, navigational decision points, or other map detail that would otherwise not be visible except for the shift in the map. Repositioning/shifting laterally is depicted by way of example in FIG. 12. In this example, map detail is obtained for an urban area to the right of highway M12 by shifting the map and indicator to the left.

Figure 13:
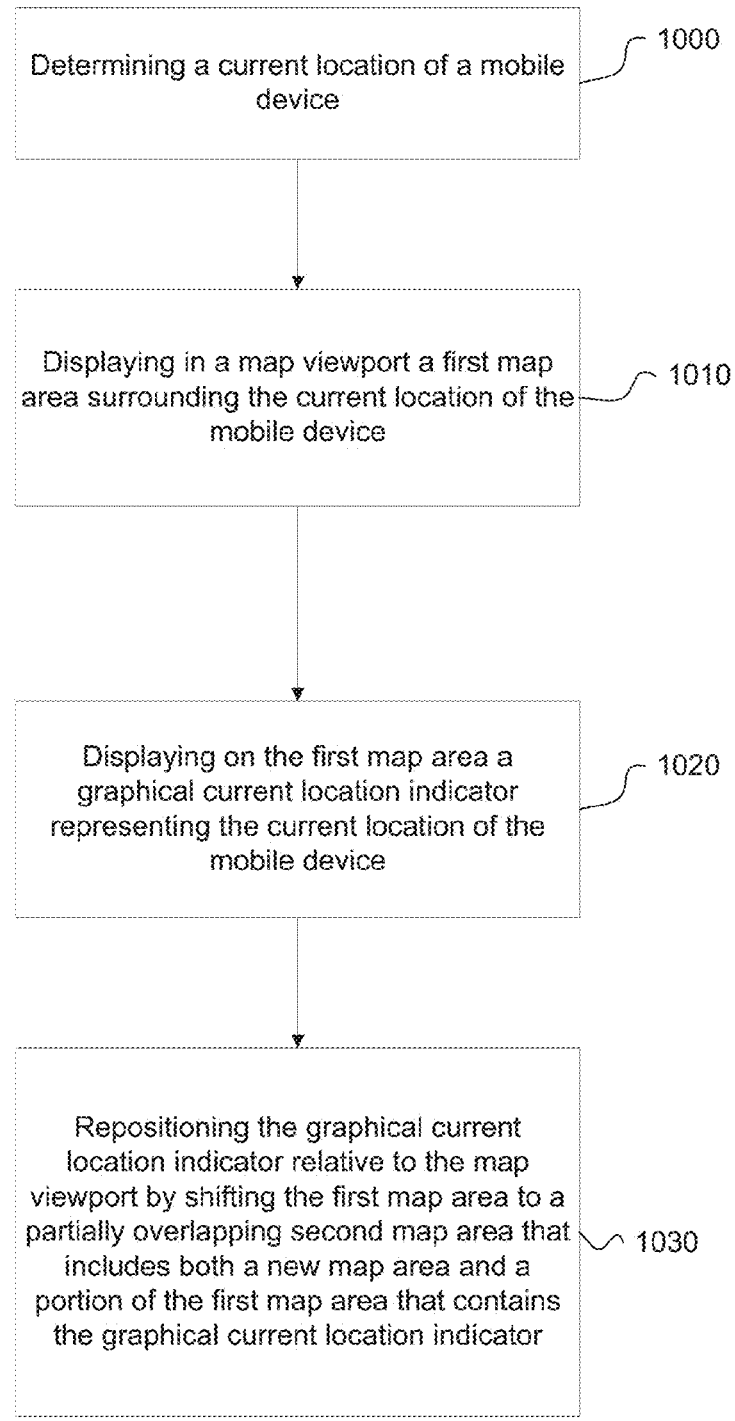
FIG. 13 is a flowchart depicting main steps of a computer-implemented method of repositioning the graphical current location indicator.

Another inventive aspect of the disclosure is a computer-implemented method performed by a computing device (e.g. a mobile device) for repositioning a graphical current location indicator relative to the map viewport. As depicted in the flowchart of FIG. 13, the computer-implemented method comprises a step, act or operation 1000 of determining a current location of a mobile device, a step, act or operation 1010 of displaying in a map viewport a first map area surrounding the current location of the mobile device; a step, act or operation 1020 of displaying on the first map area a graphical current location indicator representing the current location of the mobile device and a step, act or operation 1030 of repositioning the graphical current location indicator relative to the map viewport by shifting the first map area to a partially overlapping second map area that includes both a new map area and a portion of the first map area that contains the graphical current location indicator. The order of the steps, acts or operations may vary from what is shown in the flowchart. For example, the step, act or operation 1000 of determining the current location of the mobile device may occur before the displaying 1010 of the first map area or it may occur after the displaying 1010 of the first map area. The determining of the current location 1000 may also occur substantially simultaneously with the displaying 1010 of the first map area. The determination of the current location 1000, it is to be understood, is a recurring step in that the device repeatedly determines its current location for plotting on the map. Likewise, the device updates the graphical current location indicator on the map in response to location updates from its GPS receiver.

Repositioning may be done automatically (without user input or user intervention) or manually (in response to user input). Graphically, the shifting effect may be visually presented as a smooth or gradual movement from one area to the other or, alternatively, the map may step or jump from the first to the second map area.

In one implementation of this method, repositioning the graphical current location indicator comprises automatically shifting from the first map area to the second map area based on a predicted direction of travel and/or a velocity of the mobile device. If the device is travelling quickly in a generally consistent direction, the user navigation experience is enhanced by providing more forward map area detail at the expense of rearward map detail. The faster the device travels in a generally consistent direction of travel the less likely the user of the device will require rearward map detail. The mobile device may take into account a variety of other factors in automatically shifting or displacing the indicator and the map area: a programmed route, travel patterns, weather, traffic, calendar/appointment data, etc. The device may compute a confidence level relating to a direction of travel and then use that confidence level to vary the repositioning of the indicator. The more confident the device is, the more aggressively it can shift the indicator. If the device has zero confidence, the indicator is moved toward the central default position. If the device has maximum confidence, the indicator may be moved to the bottom edge of the viewport (assuming a track-up navigation view).

In one implementation of this method, repositioning the graphical current location indicator is proportional to the velocity of the mobile device. The faster the device travels the greater the indicator is displaced. As the device slows down, the indicator may be repositioned back to a more centralized relative position in the viewport. As the device accelerates to larger speeds, the indicator may be moved more aggressively to an edge of the viewport to maximize the amount of forward map detail in the viewport.

In one implementation of this method, repositioning comprises automatically shifting from the first map area to the second map area to display a Point of Interest in the second map area that was not visible in the first map area. The shifting may be forward or rearward or lateral (left and right) or a combination thereof. In this implementation, the device may shift the map area to maximize the view of POI's. The POI's may be location-specific search results obtained using an over-the-air search engine query or these may be default (filtered or unfiltered) POI's pre-loaded in a navigation application database (e.g. gas stations, hotels, restaurants, landmarks, parks, etc.) Shifting the map area enables the device to optimally present as many POI's as possible. The POI's may also, in another embodiment, be ranked or scored so that a maximization algorithm can weight the POI's and determine the maximum or optimal display of POI's based on their significance or ranking. In this foregoing discussion, the zoom level (or scale) remains fixed. However, as a further variant, the zoom level or scale may be adjusted.

In one implementation, a forward map area that is forward of the graphical current location indicator is displayed at a first zoom level and a rearward map area that is rearward of the graphical current location indicator is displayed at a second zoom level. In this implementation, as shown by way of example in FIG. 11, the map area within the viewport is divided into forward and rearward map areas. The forward map area is displayed at a first zoom level which may be a higher zoom level than the rearward map area. This provides maximum detail for the forward map area but still provides high-level map information for the rearward map area.

In one implementation, the method further entails receiving user input to redefine a boundary between the forward map area and the rearward map area. In other words, the user may wish to modify, adjust or customize the division between the forward and rearward map areas. This may be done by simply touching and dragging the boundary dividing the forward and rearward map areas in either a forward or rearward direction from the default boundary running through the graphical current location indicator itself.

In the foregoing paragraphs, various implementations of automatic repositioning of the indicator were described. However, as mentioned above, the repositioning method may entail manually repositioning the indicator (i.e. shifting or displacing the map area). In one implementation, repositioning the graphical current location indicator may be in response to touching and dragging the graphical current location indicator.

A touch-and-drag operation may involve the user touching the graphical current location indicator, which may optionally cause the indicator to change color or shade, and then dragging the graphical indicator (and the viewable map area on which it is plotted) from a first position relative to the viewport to a second position relative to the viewport. Optionally, the indicator may revert back to its original, default position (e.g. in the center of the map) next time the navigation application is launched. Alternatively, the user preference or setting may be remembered by the device so that the next time the navigation application is launched the indicator is placed not at the default (e.g. central) relative position but at the user's preferred relative position.

Other forms of manual input may be used to reposition the indicator such as, for example, clicking, tapping or double-tapping on the indicator and then clicking, tapping or double-tapping on a new relative position within the viewport.

In another embodiment, there may be user-selectable interface elements, e.g. shift arrows that respond to user input to cause the indicator and map area to shift by an incremental amount in the selected direction. For example, there may be up, down, left and right shift arrows displayed onscreen, either inside or outside the viewport. The user touches, clicks, taps or double-taps on one of the shift arrows to cause the indicator and map area to shift. The user may shift the map area repeatedly until the indicator reaches the edge of the viewport. The shift arrows may be instantiated in response to user input, e.g. clicking or tapping on the graphical current location indicator. The shift arrows may disappear after receiving input or after displacing the indicator or after a predetermined period of time. The shift arrows may be virtual (soft) keys or physical (hard) keys. The shift arrows may be for example the up, down, left and right arrow keys on a physical or virtual keyboard or keypad or the numbers 2, 4, 6, 8 on a number pad. The shift arrows may also include diagonal arrows.

In one embodiment, the map area may not be shifted any further (to ensure that the indicator remains visible in the viewport). In another embodiment, the map area may be shifted such that the indicator is no longer visible onscreen (within the viewport). In another embodiment, if the user shifts the indicator one step beyond the edge of the viewport, the shifted map will revert back (either immediately or after a period of time has elapsed) to a previous view showing the indicator on the edge of the viewport. Alternatively, if the user shifts the indicator one step beyond the edge of the viewport, the zoom level will change to accommodate both the new map area and the indicator within the viewport space.

Repositioning may also be in response to other user input such as, for example, a voice command. For example, the user may issue a voice command such as "Shift map forward" to cause the viewable map area to shift. The command may also include an amount of shift or a percentage of shift, e.g. "Shift map forward to the maximum" or "shift map forward by 10%". Shifting the map to the maximum extent forward would put the indicator at the bottom of the viewport (in a track-up navigation view). Margins may also be defined around the viewport to provide a minimum band of margin of rearward map area.

The technology described above may be useful not only for navigation applications but also for tracking applications (applications that track one or more moving objects on a map). An example use case illustrates the applicability to a tracking application. Consider, for example, a delivery dispatcher with a tracking application that tracks and displays the locations of delivery vehicles. At a given zoom level or for a given area of interest, the map may display several vehicles whose locations are being tracked. The dispatcher can zoom in on the map and select one particular vehicle on a viewport by touching or clicking on the vehicle's icon and repositioning it. This signifies that the dispatcher wishes to track the selected vehicle by locking its position relative to the viewport. In response the map will move to display the selected vehicle's location while keeping the vehicle "pinned" or "locked" to the same relative position on the viewport. Other vehicle icons may also be displayed on the map in the viewport, or their relative position to the selected vehicle's location may be denoted by off-map indicators/arrows so that if their actual position is not displayed on a map an indicator shows the direction in which they are located. From a remote location, the viewer of the information (e.g. the dispatcher) may be more interested in a view such as "north up" since the viewer's reference is not changing, unlike the driver or passengers of the vehicle or those walking with the mobile device. The icon representing the selected vehicle may also be unlocked relative to the viewport. For example, by touching and dragging the map, as opposed to the vehicle icon, the vehicle icon is unlocked relative to the viewport. The viewer may then select and track a different vehicle by repeating the above method.

In the foregoing embodiments, the map is shifted to reposition a single graphical location indicator (e.g. a current location indicator) relative to the viewport. In another embodiment, the repositioning may be based on two (or more) locations or points. For example, the map may contain two location indicators. One location indicator may represent a current location and the other may represent, for example, a destination on a map (e.g. a destination displayed by a navigation application). This destination (fixed point) can be pinned/fixed relative to the viewport. With both the current location of the vehicle and destination pinned relative to the viewport, the map orientation and zoom will be recalculated to draw (render) the map at the appropriate size and orientation so the vehicle and destination fit in the viewport, while keeping each locked to its relative position in the viewport. Alternatively, the second location/point can be another mobile device. Similar map calculations would apply to re-size (re-zoom) and re-orient the map to maintain the positions relative to the viewport. For the specific case of more than two points (or objects) to be fixed relative to the viewport, this can be achieved by constraining these points (objects). This would lead to a non-linear transform which can be resolved by taking the bounding polygon and scaling it to fit the viewport and positioning the pinned objects (points) to minimize their total distances to their respective desired locations.

In another implementation, the repositioning of the map acts as a trigger to cause the device to display the second map area (or new map area) in the forward direction in a 3D (perspective) view, with the first map area showing the current location in a standard planar 2D view. This may be useful in a scenario in which the user is arriving at a destination but has never been there before and does not recognize the buildings or surroundings. If the device switches to this hybrid 2D/3D view, the user would get a traditional 2D view of where they are located but also a perspective 3D view from street level of the buildings or surroundings in the road ahead. This hybrid view could be user initiated by the user in response to user input when the user realizes the user is getting close to the destination. Alternatively, the device could automatically initiate this hybrid view based on the device detecting that the device is within a predetermined distance of the destination or based on a number of blocks or intersections from the destination. The device may be configured to trigger the hybrid view based not only on at the predetermined distance but also on the speed of the device to ensure that the device has time to obtain and render the map data for the hybrid view.

The 3D view may include digital photographs, photorealistic renderings, wireframe models, or any combination thereof. The type of map data used to render the 3D map may be user-specified or automatically determined by the device or by a map server. A transitional zone between the 2D view and the 3D view may be displayed rather than providing a discontinuity between the 2D map area and the 3D view of the upcoming surroundings. There would be several options for the transitional zone, such as a middle ground of wireframes or boxes that add detail, but less detail than the photorealistic or detailed 3D view of the destination and its surroundings.

Figure 14:
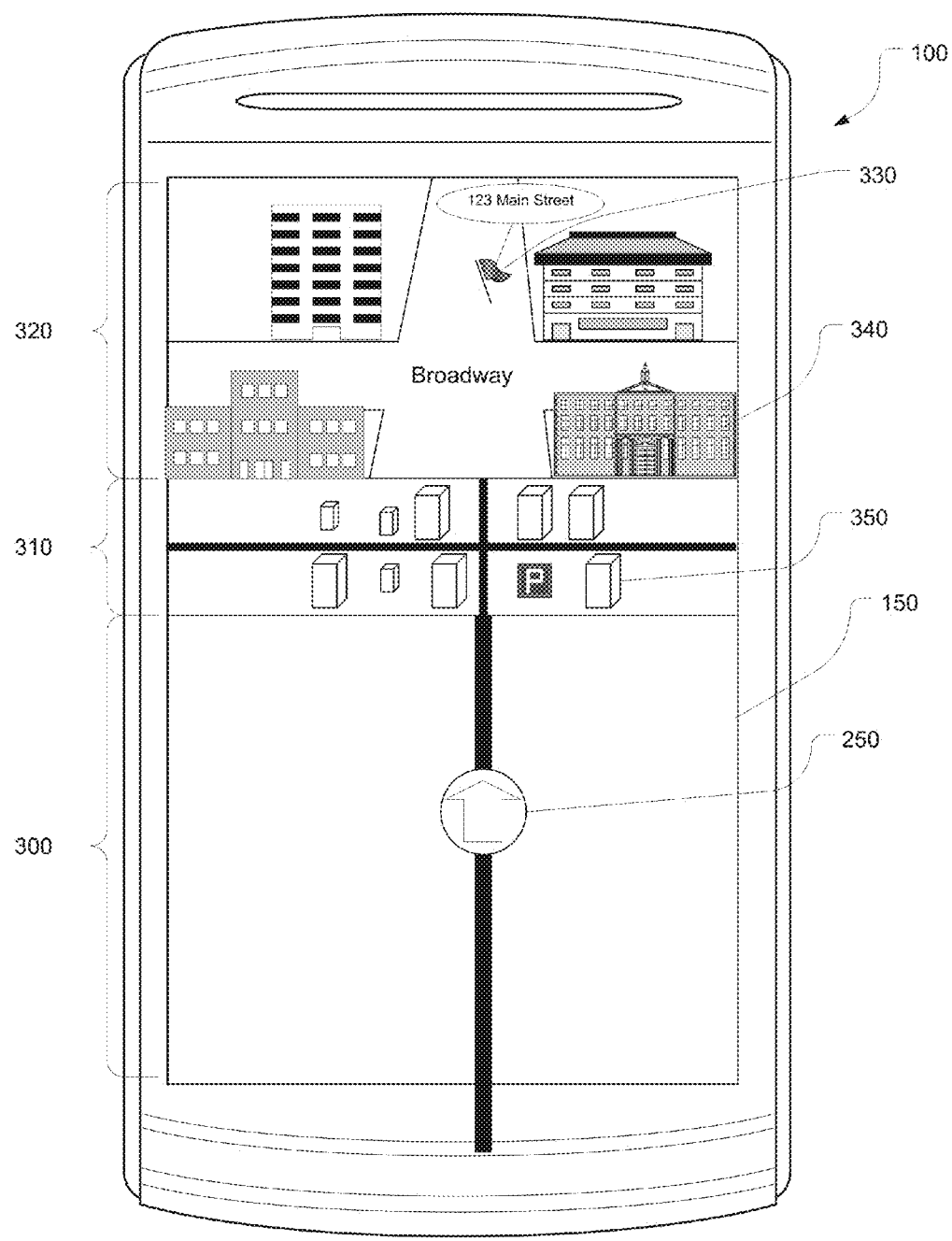
FIG. 14 depicts a mobile device presenting a hybrid map view in accordance with another implementation.

FIG. 14 depicts a mobile device 100 presenting on its display 150 an example of a hybrid map view in accordance with this further implementation of the technology. The hybrid map view includes a two-dimensional (2D) planar view 300 of the current map area that contains the graphical current location indicator 250. The hybrid map view also includes a three-dimensional (3D) perspective view 320 of the destination area and an optional transitional zone 310 in between the 2D view 300 of the current area and the 3D view 320 of the destination area. The 3D view 320 of the destination area may include photos or photorealistic renderings of the surrounding of the destination (indicated by destination flag 330). This may include photos or renderings of buildings 340 or any other landmarks or geographical features that characterize the surroundings of the destination. The transitional zone 310 may include wireframe or simplistic box-like renditions of buildings. As shown in this illustrated example, the transitional area 310 provides less detail than the destination area (3D area).

The relative proportions of onscreen space occupied by the views 300, 310 and 320 may be user-adjusted in response to user input received while displaying the hybrid view or these may be user-configured in a settings and options page. In another embodiment, the relative proportions may automatically change as the device approaches or arrives at the destination. In another embodiment, the transitional zone may be omitted entirely or may be selectively suppressed in response to user input.

In another embodiment, the device may be toggled between hybrid and purely planar views in response to user input such as manual input (touching or clicking) or voice commands. The device may toggle any one or more of the views 300, 310, 320 between planar (2D), wireframe and perspective (3D) views. For example, the device may toggle the view of the destination area between a 2D view and a 3D view.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method comprising:
    determining a current location of a mobile device;
    displaying in a map viewport a first map area surrounding the current location of the mobile device;
    displaying on the first map area a graphical current location indicator representing the current location of the mobile device; and
    repositioning the graphical current location indicator relative to the map viewport by shifting the first map area to a partially overlapping second map area that includes both a new map area and a portion of the first map area that contains the graphical current location indicator, the repositioned graphical current location indicator being displayed at a boundary of the first map area and the second map area, to thus provide proportionally more map area in a forward direction of travel wherein repositioning the graphical current location indicator comprises automatically shifting from the first map area to the second map area based on a predicted direction of travel and a velocity of the mobile device, wherein an amount by which the graphical current location indicator is repositioned is proportional to the velocity of the mobile device.

2. The method as claimed in claim 1 wherein repositioning comprises automatically shifting from the first map area to the second map area to display a Point of Interest in the second map area that was not visible in the first map area.

3. The method as claimed in claim 1 wherein a forward map area that is forward of the graphical current location indicator is displayed at a first zoom level and a rearward map area that is rearward of the graphical current location indicator is displayed at a second zoom level different from the first zoom level.

4. The method as claimed in claim 3 comprising receiving user input to redefine a boundary between the forward map area and the rearward map area.

5. The method as claimed in claim 1 comprising further repositioning the graphical current location indicator in response to touching and dragging the graphical current location indicator.

6. A non-transitory computer-readable medium comprising instructions in code which when loaded into a memory and executed by a processor of a computing device cause the computing device to:
    determine a current location of a mobile device;
    display in a map viewport a first map area surrounding the current location of the mobile device;
    display on the first map area a graphical current location indicator representing the current location of the mobile device; and
    reposition the graphical current location indicator relative to the map viewport by shifting the first map area to a partially overlapping second map area that includes both a new map area and a portion of the first map area that contains the graphical current location indicator, the repositioned graphical current location indicator being displayed at a boundary of the first map area and the second map area, to thus provide proportionally more map area in a forward direction of travel wherein the code that causes the graphical current location indicator to be repositioned comprises code for automatically shifting from the first map area to the second map area based on a predicted direction of travel and a velocity of the mobile device by an amount that is proportional to the velocity of the mobile device.

7. The non-transitory computer-readable medium as claimed in claim 6 wherein the code for repositioning comprises code that causes the computing device to automatically shift from the first map area to the second map area to display a Point of Interest in the second map area that was not visible in the first map area.

8. The non-transitory computer-readable medium as claimed in claim 6 comprising code for displaying a forward map area that is forward of the graphical current location indicator at a first zoom level and displaying a rearward map area that is rearward of the graphical current location indicator at a second zoom level different from the first zoom level.

9. The non-transitory computer-readable medium as claimed in claim 8 comprising code for receiving user input to redefine a boundary between the forward map area and the rearward map area.

10. The non-transitory computer-readable medium as claimed in claim 6 comprising code for repositioning the graphical current location indicator in response to touching and dragging the graphical current location indicator.

11. A mobile device comprising:
    a position-determining subsystem for determining a current location of the mobile device;
    a processor coupled to the memory for causing a display to display in a map viewport a first map area surrounding the current location of the mobile device and to display on the first map area a graphical current location indicator representing the current location of the mobile device; and
    wherein the processor is configured to cooperate with the display to reposition the graphical current location indicator relative to the map viewport by shifting the first map area to a partially overlapping second map area that includes both a new map area and a portion of the first map area that contains the graphical current location indicator, the repositioned graphical current location indicator being displayed at a boundary of the first map area and the second map area, to thus provide proportionally more map area in a forward direction of travel wherein the graphical current location indicator is repositioned by automatically shifting from the first map area to the second map area based on a predicted direction of travel and a velocity of the mobile device wherein the processor shifts the graphical current location indicator by an amount proportional to the velocity of the mobile device.

12. The mobile device as claimed in claim 11 wherein the processor is configured to automatically shift from the first map area to the second map area to display a Point of Interest in the second map area that was not visible in the first map area.

13. The mobile device as claimed in claim 11 wherein a forward map area that is forward of the graphical current location indicator is displayed at a first zoom level and a rearward map area that is rearward of the graphical current location indicator is displayed at a second zoom level different from the first zoom level.

14. The mobile device as claimed in claim 13 comprising a user interface for receiving user input to redefine a boundary between the forward map area and the rearward map area.

15. The mobile device as claimed in claim 11 comprising a touch-sensitive display for repositioning the graphical current location indicator by touching and dragging the graphical current location indicator.

16. The mobile device as claimed in claim 11 wherein the processor is configured to:
    receive a destination; and
    re-zoom and re-orient the map area to display both the graphical current location indicator and the destination in fixed positions relative to the view port.

17. The method as claimed in claim 1, wherein the first map area is displayed at a first zoom level and the second map area is displayed at a second zoom level.

18. The method of claim 1, wherein the boundary may be redefined by user input.

19. The method of claim 18, wherein the graphical current location indicator is located on the redefined boundary.

\* \* \* \* \*